UNITED STATES PATENT OFFICE.

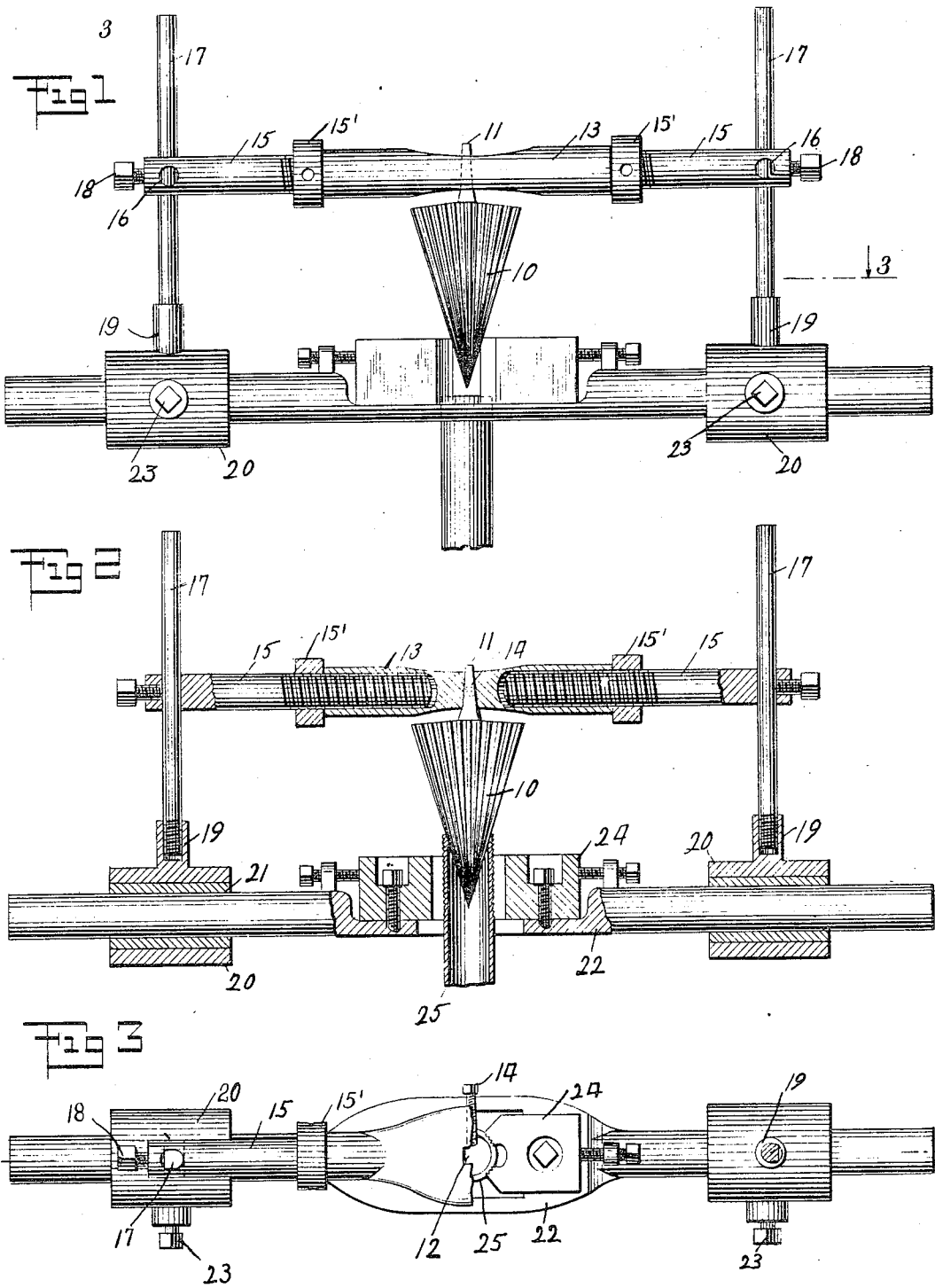

HENRY BLOOMINGTON, OF SAN FRANCISCO, CALIFORNIA.

REAMER ATTACHMENT FOR DIE-STOCKS.

1,052,308.  Specification of Letters Patent.  Patented Feb. 4, 1913.

Application filed August 31, 1912. Serial No. 718,054.

*To all whom it may concern:*

Be it known that I, HENRY BLOOMINGTON, a citizen of the United States, and a resident of San Francisco, in the county of San Francisco and State of California, have invented certain new and useful Improvements in Reamer Attachments for Die-Stocks, of which the following is a full, clear, and exact description.

The invention relates to a reamer attachment for die stocks, and has reference more particularly to a device of this class which comprises an adjustable reamer supporting member adjustably supported on the die stock.

An object of the invention is to provide an inexpensive tool, simple and strong in construction, which can be easily mounted on any die stock, and which will ream the interior extremity of a pipe simultaneously with the threading of the same exteriorly.

A further object of the invention is to provide an improved tool which will ream pipes of different sizes without changing the reamer secured thereto.

The invention consists in the construction and combination of parts to be more fully described hereinafter, and particularly set forth in the claims.

Reference is to be had to the accompanying drawings forming a part of this specification, in which similar characters of reference indicate corresponding parts, and in which—

Figure 1 is a side elevation of an embodiment of my invention, showing the position at the beginning of the operation; Fig. 2 is a section of Fig. 3 on the line 2—2, showing the position and action of the reamer at the end of the operation; and Fig. 3 is a section through Fig. 1 on the line 3—3.

Referring more particularly to the drawings, 10 is a reamer provided with a square tapered shank 11 projecting through the square tapered aperture 12 of a stock piece 13. Any desired means may be provided for clamping the shank 11 in aperture 12, as, for instance, a set screw 14. The ends of the stock piece 13 are threaded internally for receiving the threaded studs 15 provided with locking nuts 15'. The ends opposite the threaded portions are provided with apertures 16 through which vertical rods 17 project. A set screw 18 is provided at the ends of the studs 15 near the apertures 16 to clamp the studs, and, in consequence, the stock piece 13 and the reamer to the rods 17. The rods 17 are partly flattened longitudinally to give a better grip to set screws 18, and at their lower ends are threaded into sleeves 19 forming integral parts of slidable collars 20 provided with bearing bushings 21, all mounted on a die stock 22. A set screw 23 is provided in each of the collars 20 for clamping the same at various points on the handle of the die stock. The die stock 22, as shown in the drawings, is provided with dies 24 engaging a pipe 25.

The pipe 25 to be threaded and reamed is placed in a pipe vise, not shown in the drawings, and a die stock provided with my tool is then applied to the pipe as shown in Fig. 1. The die stock is then turned, and, in consequence, a thread is formed on the end of the pipe, and as the die stock advances on the pipe the reamer 10 engages the inner end of the pipe and reams it, as is shown in Fig. 2. It can be easily seen that any length of the pipe can be threaded before the reaming action begins, and this can be regulated by simply raising and lowering the studs 15. By the same action a larger pipe can be reamed by advancing or lowering the reamer on the rods 17. When the device is transferred to another die stock requiring a larger or smaller spacing between the rods 17, the studs 15 in the stock die 13 are screwed in or out to compensate for the difference required, and held in place by the locking nuts 15', and by the same action the centering of the reamer with reference to the dies is easily obtained. It will also be noted that with my device no special reamer is required, as any style of the standard reamer may be used.

Having thus described my invention, what I claim as new and desire to secure by Letters Patent is:—

1. In combination with a die stock and a reamer, a device of the class described comprising a stock piece carrying said reamer, two adjustable supports on the die stock, and threaded studs in the ends of said stock piece each in engagement with one of said adjustable supports whereby the centering of said reamer and the variation of distance between said adjustable supports is made.

2. In combination with a die stock and a reamer, a device of the class described comprising a stock piece carrying said reamer, threaded studs in said stock piece, adjustable supports on the die stock in engagement with said studs, and clamping means in said studs whereby said reamer may be adjusted at any desired distance from the dies of the die stock.

3. In a device of the character described, the combination with a die stock carrying a die and a reamer coacting with said die, of means for supporting said reamer, studs adjustably connected to opposite sides of said reamer supporting means whereby the outer ends may be adjusted toward and from said reamer supporting means, and means adjustably connected with said die stock engaging the outer ends of said studs for supporting the studs and the reamer supporting means regardless of the position of the ends of said studs.

In testimony whereof I have signed my name to this specification in the presence of two subscribing witnesses.

HENRY BLOOMINGTON.

Witnesses:
RUDOLPH MORGENSTERN,
ABE LONDON.